United States Patent [19]

Sandhu

[11] Patent Number: 5,618,447

[45] Date of Patent: Apr. 8, 1997

[54] POLISHING PAD COUNTER METER AND METHOD FOR REAL-TIME CONTROL OF THE POLISHING RATE IN CHEMICAL-MECHANICAL POLISHING OF SEMICONDUCTOR WAFERS

[75] Inventor: Gurtej S. Sandhu, Boise, Id.

[73] Assignee: Micron Technology, Inc., Boise, Id.

[21] Appl. No.: 600,342

[22] Filed: Feb. 13, 1996

[51] Int. Cl.$^6$ ............................ H01L 21/00; B24B 49/00
[52] U.S. Cl. .................. 438/14; 216/88; 216/89; 216/86; 451/5; 451/8
[58] Field of Search .................. 216/86, 88, 89; 156/345, 626.1, 627.1, 636.1; 451/8, 21, 444

[56] References Cited

U.S. PATENT DOCUMENTS

| | | |
|---|---|---|
| 4,193,226 | 3/1980 | Gill, Jr. et al. ..................... 51/124 R |
| 4,199,902 | 4/1980 | Sauerland ........................... 51/165 R |
| 4,407,094 | 10/1983 | Bennett et al. .................... 51/165 R |
| 4,793,895 | 12/1988 | Kanata et al. ........................ 156/627 |
| 4,879,258 | 11/1989 | Fisher ...................................... 437/225 |
| 4,910,155 | 3/1990 | Cote et al. .................................. 437/8 |
| 4,971,445 | 11/1990 | Sato et al. ................................ 356/376 |
| 5,272,117 | 12/1993 | Roth et al. .............................. 437/228 |
| 5,324,381 | 6/1994 | Nishiguchi ............................... 156/297 |
| 5,444,637 | 8/1995 | Smesny et al. ......................... 364/556 |
| 5,486,129 | 1/1996 | Sandhu et al. ............................... 41/5 |

Primary Examiner—R. Bruce Breneman
Assistant Examiner—Michael F. Adjodha
Attorney, Agent, or Firm—Seed and Berry LLP

[57] ABSTRACT

The present invention is a contour meter that measures the contour of a polishing surface of a polishing pad used in chemical-mechanical polishing of semiconductor wafers. The contour meter has a support member positionable over the polishing surface of a pad, a displacement sensor attached to the support member, and a converter operatively coupled to the displacement sensor. The sensor has a guide member and a pin slidably attached to the guide member. The sensor is attached to the support member to position the pin in a reference plane with respect to the polishing surface, and the pin is controllably engageable with the polishing surface to follow the contour of the polishing surface as at least one of the sensor or the pad moves with respect to the other. The sensor senses changes in the vertical displacement between the support member and the pin as the pin follows the contour of the polishing surface, and it produces signals corresponding to the sensed displacement changes. The converter receives the signals generated by the sensor and converts them into a numerical representation of the contour of the polishing surface.

18 Claims, 3 Drawing Sheets

POLISHING PAD COUNTER METER AND METHOD FOR REAL-TIME CONTROL OF THE POLISHING RATE IN CHEMICAL-MECHANICAL POLISHING OF SEMICONDUCTOR WAFERS

TECHNICAL FIELD

The present invention relates to a contour meter and a method of using the contour meter to control the polishing rate of a wafer in chemical-mechanical polishing of semiconductor wafers.

BACKGROUND OF THE INVENTION

Chemical-mechanical polishing ("CMP") processes remove materials from the surface layer of a wafer in the production of ultra-high density. integrated circuits. In a typical CMP process, a wafer presses against a polishing pad in the presence of a slurry under controlled chemical, pressure, velocity, and temperature conditions. The slurry, solution has abrasive particles that abrade the surface of the wafer, and chemicals that oxidize and/or etch the surface of the wafer. Thus, when relative motion is imparted between the wafer and the pad, material is removed from the surface of the wafer by the abrasive particles (mechanical removal) and by the chemicals (chemical removal) in the slurry.

Figure 1:
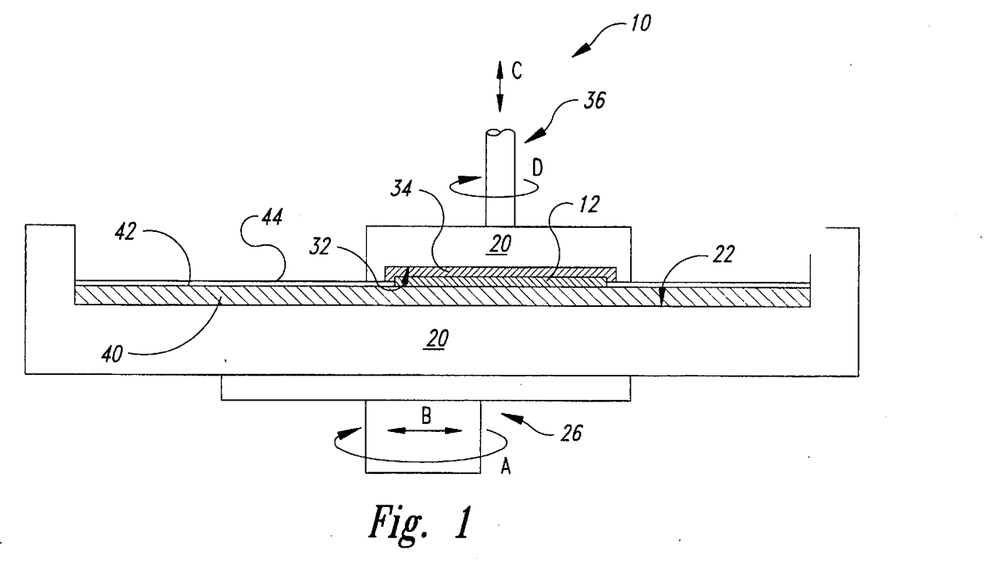
FIG. 1 is a schematic cross-sectional view of a polishing machine in accordance with the prior art.

FIG. 1 schematically illustrates a conventional CMP machine 10 with a platen 20, a wafer carrier 30, a polishing pad 40, and a slurry 44 on the polishing pad. The platen 20 has a surface 22 upon which the polishing pad 40 is positioned. A drive assembly 26 rotates the platen 20 as indicated by arrow "A". In another existing embodiment, the drive assembly 26 reciprocates the platen back and forth as indicated by arrow "B". The motion of the platen 20 is imparted to the pad 40 because the polishing pad 40 frictionally engages the surface 22 of the platen 20. The wafer carrier 30 has a lower surface 32 to which a wafer 12 may be attached, or the wafer 12 may be attached to a resilient pad 34 positioned between the wafer 12 and the lower surface 32. The wafer carrier 30 may be a weighted, free-floating wafer carrier, or an actuator assembly 36 may be attached to the wafer carrier 30 to impart axial and rotational motion, as indicated by arrows "C" and "D", respectively.

In the operation of the conventional polisher 10, the wafer 12 is positioned face-downward against the polishing pad 40, and then the platen 20 and the wafer carrier 30 move relative to one another. As the face of the wafer 12 moves across the polishing surface 42 of the polishing pad 40, the polishing pad 40 and the slurry 44 remove material from the wafer 12.

CMP processes must consistently and accurately produce a uniform, planar surface on the wafer because it is important to accurately focus circuit patterns on the wafer. As the density of integrated circuits increases, current lithographic techniques must accurately focus the critical dimensions of photo-patterns to within a tolerance of approximately 0.35–0.5 μm. Focusing the photo-patterns to such small tolerances, however, is very difficult when the distance between the emission source and the surface of the wafer varies because the surface of the wafer is not uniformly planar. In fact, when the surface of the wafer is not uniformly planar, several devices on the wafer may be defective. Thus, CMP processes must create a highly uniform, planar surface.

The surface of a wafer, however, may not be uniformly planar because the rate at which the thickness of the wafer decreases as it is being polished (the "polishing rate") often varies from one area on the wafer to another. The polishing rate is a function of several factors, one of which is the local pressure between the pad and the wafer across the face of the wafer. The local pressure between the pad and wafer typically varies because the contour of the polishing surface of the pad may not be uniformly planar. Moreover, the contour the polishing surface of a pad changes over time because one portion of the pad may wear at a different rate than another. For example, in polishing pads made from a polymeric matrix material and an abrasive filler material, regions on the pad with a high density of the filler material wear at a different rate than other regions on the pad. Therefore, it is desirable to measure the contour of the pad throughout the CMP process, and then either condition the pad to enhance the planarity of the pad or adjust the pressure between the wafer and the pad.

One existing device for measuring the contour of the polishing surface of a polishing pad is an arm-type stylus with a needle-like tip attached to a pivotable arm. In operation, the tip follows the contour of the pad as the stylus moves across the surface of the pad. The tip causes the arm to pivot about its pivot point so that the angular deflection of the arm is proportional to the change in the contour of the pad. Another existing device for measuring the contour of the polishing surface is an interferometer. Interferometers typically direct a laser beam at the surface of the wafer and measure a phase change between the original beam and the beam reflected from the polishing surface. By knowing the wavelength of the laser beam, the phase change indicates the linear displacement from one point on the pad to another.

One problem with existing measuring devices is that they are not well suited for accurately measuring the contour of a polishing surface, in real-time while a wafer is polished. Real-time measurements are desirable to eliminate the down-time associated with stopping a polisher to measure the pad. Real-time measurements are also desirable because the contour of a pad may change while a wafer is being polished. However, accurately measuring the contour of the pad in real-time is difficult because the pad is moving and a layer of slurry coats the pad. Interferometers, for example, may generate inaccurate real-time measurements because the light beam may reflect off the slurry instead of the pad. Conventional arm-type styluses may also generate inaccurate real-time measurements because the arm has a relatively large mass compared to the tip. Thus, after the tip passes over a sharp rise on the polishing surface, the upward momentum of the arm may cause the tip to momentarily disengage the pad and produce a false reading.

Another problem with conventional contour measuring devices is that they only measure the contour of the polishing surface of a pad along a radius of the pad. Measuring the contour of the pad along a radius does not provide a highly accurate indication of the contour of the whole pad because the contour along one radius may not be the same as that along another radius. Thus, unless the contour is measured along several radii of the pad (which is time-consuming and inefficient), conventional measuring devices only provide a local measurement of the contour of a polishing pad.

In light of the problems associated with conventional pad contour measuring devices, it would be desirable to develop a device tier measuring the contour of the polishing surface of a polishing pad in real-time while a wafer is being polished. Additionally, it would be desirable to measure a greater area of the polishing pad to provide more data without reducing the throughput of the CMP process.

SUMMARY OF THE INVENTION

The inventive contour meter measures the contour of a polishing surface of a polishing pad used in chemical-mechanical polishing of semiconductor wafers. The contour meter has a support member positionable over the polishing surface of a pad, a displacement sensor attached to the support member, and a converter operatively coupled to the displacement sensor. The sensor has a guide member attached to the support member, and a pin slidably attached to the guide member. The sensor is attached to the support member to position the pin in a reference plane with respect to the polishing surface, and the pin is controllably engageable with the polishing surface to follow the contour of the polishing surface as at least one of the sensor or the pad moves with respect to the other. The sensor senses changes in the vertical displacement between the support member and the pin as the pin follows the contour of the polishing surface, and it produces signals corresponding to the sensed displacement changes. The converter receives the signals generated by the sensor and converts them into a numerical representation of the contour of the polishing surface.

In another inventive embodiment, the contour meter is operatively coupled to a control system having a processor and a wafer displacement mechanism operatively coupled to the processor. Using the signals from the contour meter, the processor controls the displacement mechanism to adjust the position or the shape of the wafer in correspondence to the contour of the polishing surface. The contour meter and control system thus provide a substantially constant pressure between the wafer and the polishing surface.

DETAILED DESCRIPTION OF THE INVENTION

The present invention is a contour meter, and control system that measures the contour of a wafer in real-time while it is being polished with a CMP process, and controls the pressure between the wafer and the pad in response to the measured contour of the wafer. The contour meter and control system of the invention also can be used to manipulate the contour of the pad in real-time while a wafer is being polished. An important aspect of the invention is that a piezoelectric or electromagnetic sensor is used to accurately measure the change in contour of the pad in real-time and in situ while the wafer is being polished. Piezoelectric or electromagnetic sensors can respond to changes in the contour of the pad at high pad velocities, and they are not affected by the presence of the slurry on the polishing surface of the pad. Accordingly, the contour meter is particularly useful for measuring the contour of a polishing pad in real-time and in situ during the CMP process.

Figure 2:
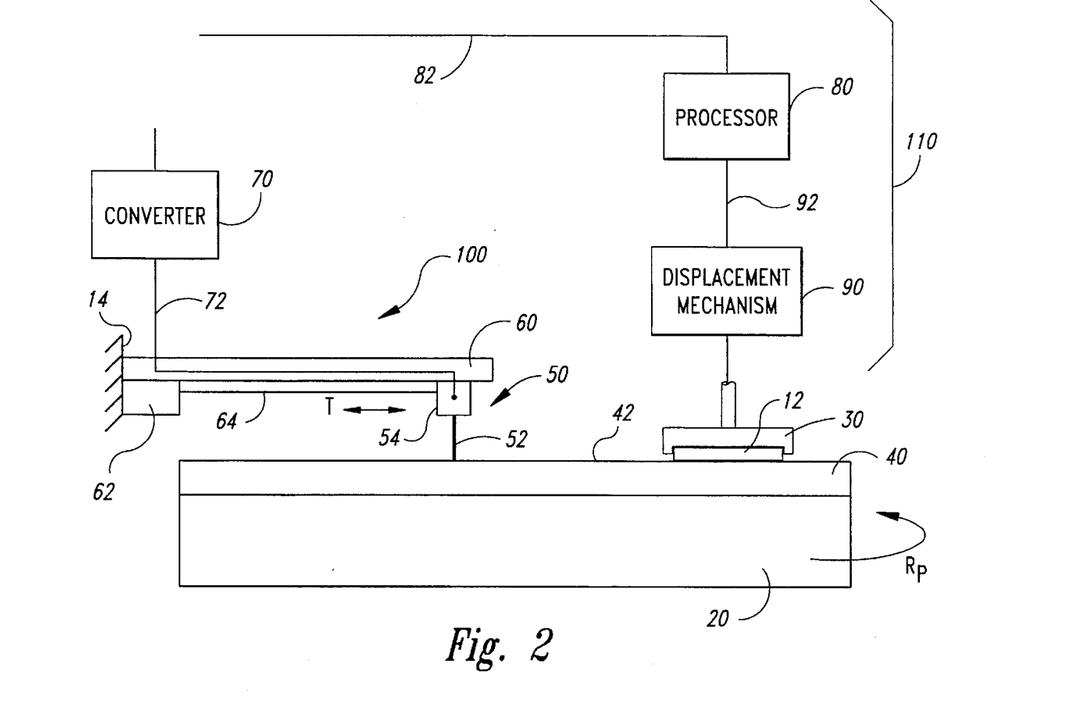
FIG. 2 is a schematic diagram of a contour meter and control system for controlling the polishing rate of a semiconductor wafer in real-time in accordance with the invention.

FIG. 2 illustrates a contour meter 100 in accordance with the invention positioned over a polishing pad 40 and platen 20 of a polisher, such as the conventional polisher 10 discussed above with respect to FIG. 1. The contour meter 100 has a support member 60 positioned over a radius of the pad 40, a sensor 50 movably attached to the support member 60, and an actuator 62 operatively connected to the sensor 50 to translate the sensor 50 in the direction T along the support member 60. The support member 60 may be a beam attached to a fixed foundation 14, such as a wall, the frame of the polishing machine, or a separate stand. The actuator 62 may be fixed to either the support member 60 or the foundation 14. The support member 60 is accordingly fixed against vertical movement to prevent displacement between the support member 60 and the polishing pad 40 along an axis normal to the polishing surface 42 of the polishing pad 40. The actuator 62 is either a pneumatic cylinder, a hydraulic cylinder, a servomotor, or any other type device that moves the sensor 50 along the support member 60. A connector 64, which may be a shaft, a threaded member, or a cable, connects the actuator 62 to the sensor 50.

The sensor 50 has a guide member 54 and a pin 52 slidably attached to the guide member 54. The guide member 54 is preferably a housing or bracket attached to the support member 60. In operation, the lower end of the pin 52 engages the polishing surface 42 of the pad 40, and the sensor 50 translates along the support member 60. The lower end of the pin 52 accordingly rides over the polishing surface 42 and moves perpendicularly to the polishing surface 42 in response to the contour of the polishing surface 42. The pin 52 is biased downwardly against the polishing surface 42 of the pad 40 by a spring or air pressure to ensure that the pin 52 continuously engages the polishing surface 42. The displacement between the pin 52 and the support member 60 generates a signal that is proportional to the change in contour of the polishing surface 42. In a preferred embodiment, the pin 52 slides vertically with respect to the support member 60, and the sensor 50 is attached to the support member 60 to position the pin 52 in a reference plane substantially perpendicular to the polishing surface 42 of the pad 40. Thus, as the pin 52 moves across the polishing surface 42, the displacement between the pin 52 and the support member 60 directly corresponds to the contour of the polishing surface 42.

In one embodiment, the sensor 50 is a piezoelectric sensor that measures the displacement between the pin 52 and the guide member 60 by measuring the change in pressure in a chamber (not shown) positioned between the support member 60 and the pin 52. In another embodiment, the guide member 54 is a housing with electromagnetic sensor that measures the displacement between the pin 52 and the housing by measuring the current produced by changes in a magnetic field housed within the housing. One suitable sensor having an accuracy of approximately 0.02 mm is the IDU DIGIMATIC INDICATOR Series 575 manufactured by Mitutoyo Company of Japan. In still another embodiment, the sensor 50 is an interferometer (not shown) attached to the support member 60 that impinges a light beam onto the upper end of the pin 52. The interferometer measures the displacement between the upper end of the pin 52 and the support member 60.

The sensor 50 is operatively coupled to a converter 70 that receives the signals from the sensor 50. The signals are transmitted from the sensor 50 to the converter 70 along a path 72, which may be an electrical, optical, acoustical or other transmission medium. The converter 70 converts the signals from the sensor 50 into values that represent the change in contour of the polishing surface with regard to an initial reference point on the polishing surface. The converter 70 is preferably directly connected to the sensor 50, as with the Mitutoyo IDU DIGIMATIC INDICATOR Series 575.

In a one embodiment, the contour meter 100 is operatively coupled to a control system 110 with a processor 80 and a wafer displacement mechanism 90 that adjusts the pressure between the wafer 12 and the polishing pad 40. To couple the contour meter 100 to the control system 110, the converter 70 is operatively coupled to the processor 80 by a link 82, which may be an electrical or optical transmission medium. The processor 80 processes the data from the converter 70 and controls the displacement mechanism 90 as disclosed in allowed U.S. application Ser. No. 08/112,759, entitled SYSTEM AND METHOD FOR REAL-TIME CONTROL OF SEMICONDUCTOR WAFER POLISHING, AND A POLISHING HEAD, which is herein incorporated by reference.

The displacement mechanism 90 selectively adjusts either the down force on the wafer carrier 30 or the back pressure between the wafer carrier 30 and the wafer 12. As disclosed in U.S. application Ser. No. 08/112,759, the back pressure between the wafer carrier 30 and the wafer 12 may be selectively adjusted across the back of the wafer 12 by a number of axial actuators (not shown) positioned between the wafer carrier 30 and the back side of the wafer 12. The actuators, which may be pneumatic, hydraulic or electromotive actuators, are controlled by the processor 80 in response to the measured contour of the polishing surface 42. In operation, the actuators apply different localized pressures on individual regions of the back side of the wafer 12. The actuators accordingly bend the wafer 12 to optimize the uniformity of the polished surface on the wafer. For example, less pressure may be exerted against the perimeter of the wafer than at its center to reduce over-polishing at the outer regions of the wafer. Similarly, the wafer 12 may be bent to match the contour of the polishing surface 42 of the pad 40. When the actuators are servo-mechanical devices, the processor 80 sends signals through a coupling means 92 to move the servomechanism of the actuators to a desired position. The coupling means 92 may be a bus or other suitable conductor through which the signals between the processor 80 and the individual actuators are transmitted. When the actuators are fluid driven devices, the coupling means 92 is a conduit through which a pressurized fluid from a motor (not shown) is pumped.

In another embodiment of the invention (not shown), the processor 80 is operatively coupled to a pad conditioning device (not shown). One suitable pad conditioning device is a diamond embedded disk that removes a layer of material from the surface of the pad to create a new polishing surface. The processor 80 selectively controls the pad conditioning device according to the contour measurements from the sensor 50 to change the contour of the polishing surface 42 of the pad 40. For example, high points on the polishing surface 42 may be removed to create a flat surface, or other regions of the polishing surface 42 may be removed to produce the desired contour. After the pad has been selectively conditioned, the contour of the new polishing surface is preferably re-measured to determine whether the new polishing surface has the desired post-conditioning contour.

Figure 3:
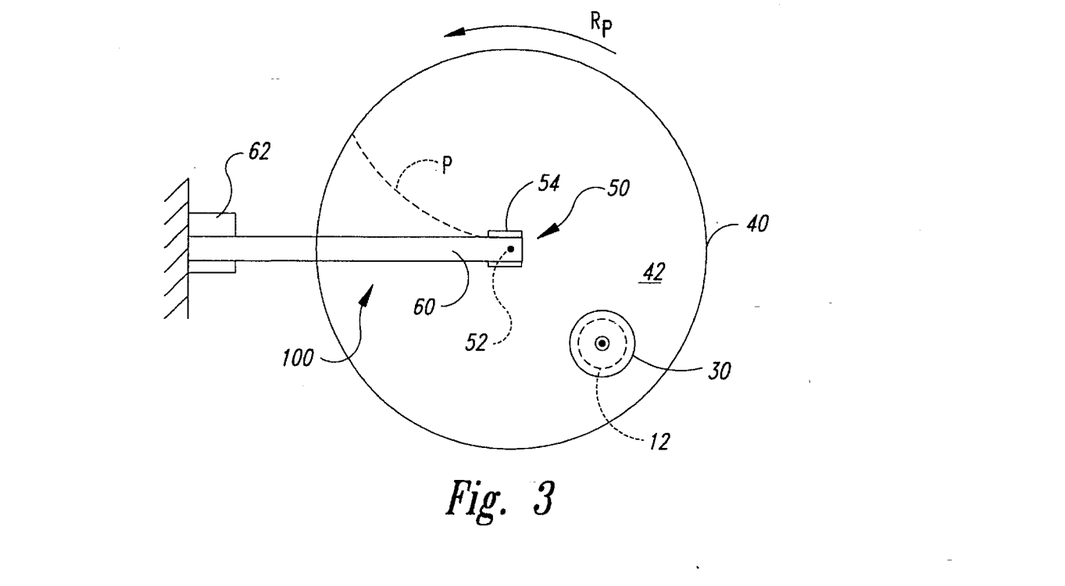
FIG. 3 is a schematic top elevational view of a contour meter in accordance with the invention.

FIGS. 2 and 3 together illustrate the operation of the contour meter 100 and the control system 110. The sensor 50 is initially positioned over the center of the pad 40, and the pin 52 of the sensor 50 engages the polishing surface 42 of the pad 40. The pad 40 rotates in a direction indicated by arrow $R_p$, and the sensor 50 translates along the support member 60 radially outwardly with respect to the pad 40. The pin 52 accordingly travels over the polishing surface 42 along a path P. The position of the pin 52 with respect to points along the path P is determined by starting the pin 52 at a reference point (usually the center of the polishing surface 42), timing the measuring process, translating the sensor 50 along the support member 60 at a predetermined linear velocity, and rotating the pad 40 at a predetermined angular velocity. An electromagnetic transducer (not shown) may also be attached to the perimeter of the platen 20 and a wall (not shown) of the polisher to indicate a reference radius on the pad 40 and the angular velocity of the pad 40. By knowing the starting position, time, and velocities of the sensor 50 and the pad 40, the positions of the sensor 50 and the polishing surface 42 may be continuously calculated as a function of time during the measuring process. Thus, the contour of the polishing surface 42 along path P is determined by correlating the displacement measurements from the sensor 50 with the calculated positions of the sensor 50 and the polishing surface 42 at the same points in time. The processor 80 preferably stores the information from the sensor 50 and the position calculations in appropriate data files, and then correlates the information in the data files to compute the contour of the polishing surface 42. In another embodiment, electronic or optical position indicators (not shown) may be attached to the sensor 50 and platen 20 to determine the position of the sensor 50 and pad 40 at any given point in time. By continuously translating the sensor 52 along the support member 60 while the pin 52 engages the polishing surface 42, the contour meter 100 continuously measures the contour of several arcuate regions of the polishing surface of the pad 40. Using the data generated by the sensor 50 and the calculated positions of the sensor 50 and polishing surface 42, the processor 80 also controls the displacement mechanism 90 to adjust the pressure between the wafer 12 and the polishing pad 40. The pin 52 is preferably engaged with the polishing surface 42 of the pad 40 while a wafer 12 is being polished on another part of the pad 40 to provide real-time, in situ measurements of the contour of the polishing surface.

One advantage of the present invention is that the contour meter 100 provides real-time, in situ measurements of the contour of the polishing surface 42 of the pad 40 while the wafer 12 is being polished. Compared to conventional contour measuring devices, the contour meter 100 enhances the throughput of the CMP process because the polishing machine is not idle when the measurements are performed. Another advantage of the present invention is that the contour meter 100 provides accurate measurements of the contour of the polishing surface 42 at relatively high pad velocities and with thick layers of slurry on the polishing surface 42. By preventing vertical displacement between the support member 60, the housing 54, and the polishing surface 42, the pin 52 is more responsive to changes in the contour of the polishing surface 42 than arm-type styluses. Moreover, the pin 52 easily passes through any slurry on the polishing pad 40. Accordingly, the present invention provides more accurate real-time, in situ measurements of the contour of the polishing surface 42.

Figure 4:
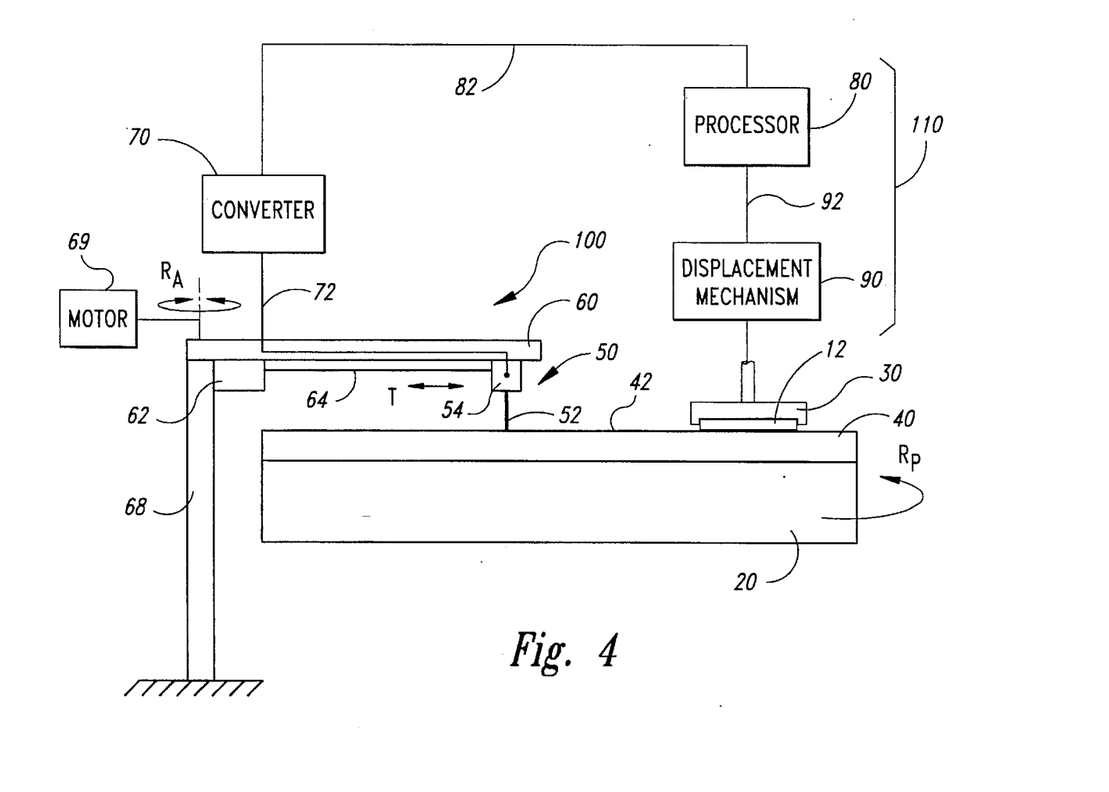
FIG. 4 is a schematic side elevational view of another contour meter in accordance with the invention.

FIG. 4 illustrates another embodiment of the contour meter 100 in which the support member 60 is rotatably attached to a stand 68. As discussed above with respect to FIG. 2, the support member 60 is still fixed against vertical movement to prevent displacement between the support member 60 and the polishing pad 40 along an axis normal to the polishing surface 42 of the polishing pad 40. A motor 69 rotates the support member 60 about the longitudinal axis of the stand 68. The motor 69 is preferably a servomotor that moves the support member 60 in a precise, controlled manner with respect to the polishing pad 40. By rotating the support member 60 and simultaneously translating the sensor 50 along the support member 60, the path of the pin 52 over the polishing surface 42 of the pad 40 may be selectively adjusted to travel over only selected portions of the pad 40.

Figure 5:
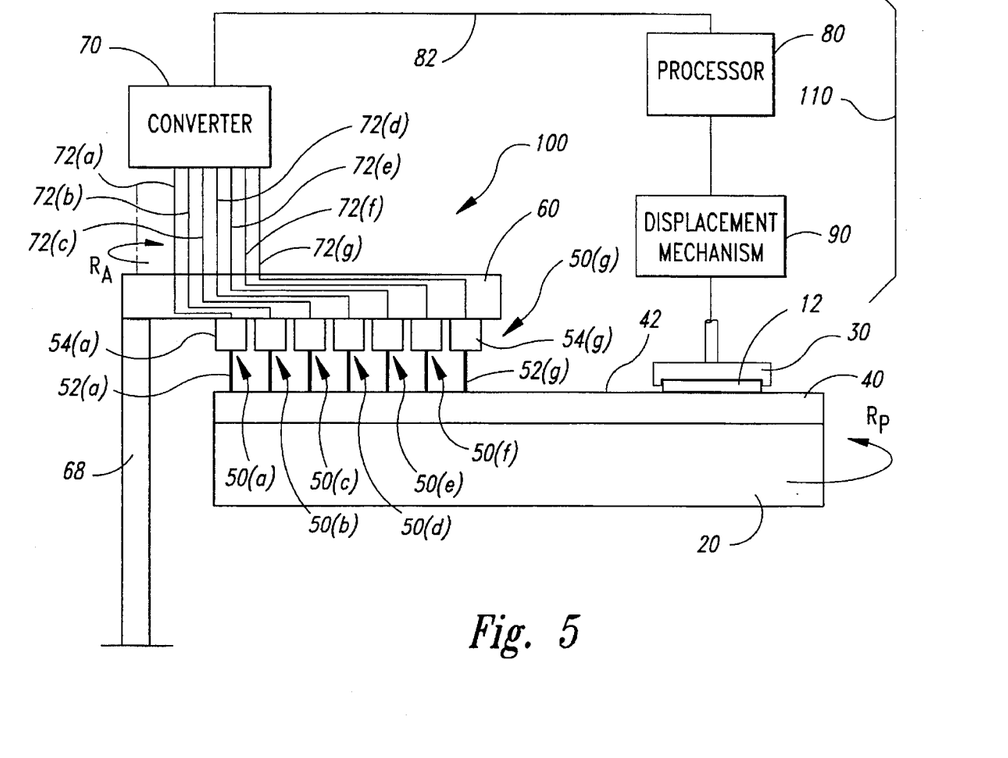
FIG. 5 is a schematic side elevational view of another contour meter in accordance with the invention.

FIG. 5 illustrates another embodiment of the contour meter 100 in which a plurality of sensors 50(a)–50(g) are attached to the support member 60. The support member 60 may be rotatably attached to a rigid, fixed stand 68, or it may be fixed to a wall (not shown). In one embodiment, the sensors 50(a)–50(g) are stationary with respect to the support member 60 while the pad 40 rotates so that each of the pins 52(a)–52(g) of the sensors 50(a)–50(g) engages the polishing surface 42 of the pad 40 along a circular path. In another embodiment, the sensors 50(a)–50(g) are moveable along the support member 60 while the pad 40 rotates. The sensors may move in tandem or individually within the space between each other on the support member 60. The signals from the sensors 50(a)–50(g) are sent to the converter 70 through a number of paths 72(a)–72(g). In an alternative embodiment (not shown), a separate converter 70 is attached to each of the sensors 50(a)–50(g). The data from the sensors 50(a)–50(g) and the converter 70 is sent to the processor 80, which controls the displacement mechanism 90 as discussed above with respect to FIG. 2.

Figure 6:
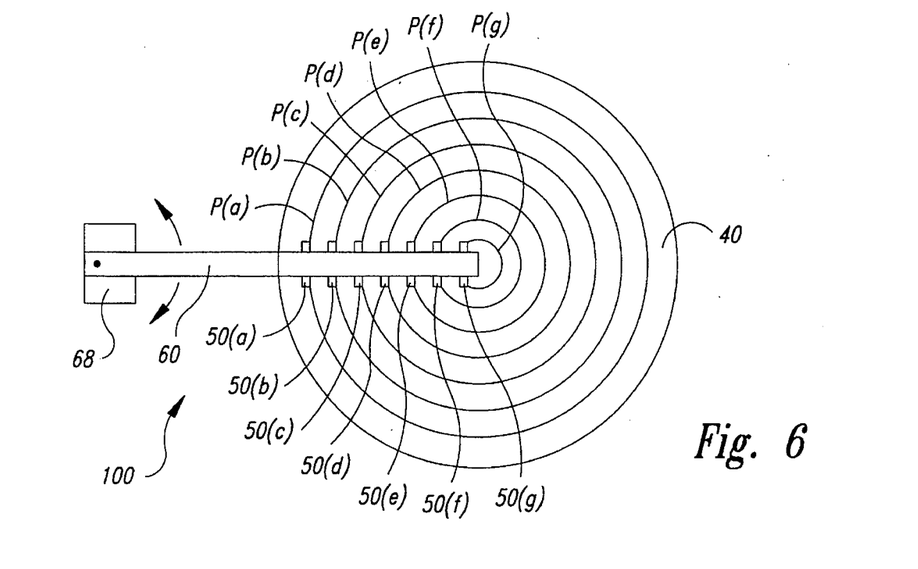
FIG. 6 is a schematic top elevational view of the measuring paths of a contour meter in accordance with the invention.

FIG. 6 illustrates the concentric paths P(a)–P(g) upon which the plurality of sensors 50(a)–50(g) engage a polishing surface 42 of the pad 40. The positions of the sensors 50(a)–50(g) with respect to points along paths P(a)–P(g), respectively, is determined by starting the measuring process at a reference position, timing the measuring process, and rotating the pad 40 at a controlled, known velocity. The positions of the sensors 50 with respect to the polishing surface 42 are accordingly calculated as a function of time. Thus, the contour of the polishing surface 42 along the paths P(a)–P(g) is determined by correlating the displacement measurements from the sensors 50 with the calculated positions of the sensors and polishing surface at the same points in time. The sensors 50 are spaced apart from one another by an equal distance, and more sensors 50 may be used to provide a more accurate indication of the contour of the polishing surface 42. One advantage of measuring the contour of the polishing surface 42 with the a plurality of sensors 50(a)–50(g) is that the contour meter 100 produces more data in less time than a single sensor. The contour of the entire polishing surface 42 of the pad 40, in fact, can be measured in a single revolution of the pad 40. Thus, more accurate and timely information is sent to the processor 80 (shown in FIG. 5) to more accurately control the pressure between a wafer and a polishing pad.

It will be appreciated that, although specific embodiments of the invention have been described herein for purposes of illustration, various modifications may be made without departing from the spirit and scope of the invention. Accordingly, the invention is not limited except as by the appended claims.

I claim:

1. A method of measuring the contour of a polishing surface of a polishing pad in chemical-mechanical polishing of semiconductor wafers, comprising:

pressing a pin of a vertical displacement sensor against the pad, the sensor producing a signal proportionate to the vertical displacement between the pin and a support member to which the sensor is attached;

moving at least one of the sensor and the pad with respect to the other, wherein the sensor senses changes in displacement between the pin and the support member as the polishing surface passes across the pin and produces signals corresponding to the sensed displacement changes in proportion to the contour of the pad; and converting the signals from the sensor into a numerical representation of the contour of the pad.

2. The method of claim 1 wherein the sensor comprises a plurality of sensors positioned on a common line to form an elongated array, the pressing step comprising positioning the elongated array against the polishing surface so that the common line is aligned with a radius of the pad and the moving step comprising holding the array stationary and rotating the pad across the array.

3. The method of claim 1 wherein the moving step comprises moving the sensor along a support member positioned over the pad to translate the pin across the polishing surface.

4. A polishing pad contour meter for measuring the contour of a polishing surface of a polishing pad used in polishing of semiconductor wafers, comprising:

a support member positionable over the polishing pad at a fixed distance from the polishing surface;

a displacement sensor having a guide member mounted to the support member and a pin slidably attached to the guide member, the guide member being mounted to the support member to position the pin in a reference plane with respect to the polishing surface, the pin being controllably engageable with the polishing surface to follow the contour of the polishing surface as at least one of the sensor or the pad moves with respect to the other, wherein the sensor senses changes in vertical displacement between the support member and the pin as the pin follows the contour of the polishing surface and produces signals corresponding to the sensed displacement changes; and a converter operatively coupled to the sensor to receive the signals generated by the sensor, the converter converting the signals from the sensor into digital representations of the displacement between the housing and the pin.

5. The contour meter of claim 4 wherein the sensor is a piezoelectric sensor.

6. The contour meter of claim 4 wherein the sensor is an electromagnetic displacement sensor.

7. The contour meter of claim 4 wherein the support member is a stationary beam and the sensor moves along the beam to pass the pin over the polishing surface.

8. The contour meter of claim 7, further comprising an actuator attached to the sensor for moving the sensor along the beam.

9. The contour meter of claim 8 wherein the actuator is a pneumatic cylinder with an extensible rod, the rod being extended to position the sensor proximate to the center of the polishing surface and retracted to position the sensor proximate to the perimeter of the polishing surface.

10. The contour meter of claim 7 wherein the beam rotates to translate the pin across the polishing surface.

11. The contour meter of claim 4 wherein the support member is positioned over a radius of the pad and the contour meter further comprises a plurality of sensors attached to the support member.

12. The contour meter of claim 11 wherein the support member is stationary as the pad rotates and the plurality of sensors measure the contour along a plurality of concentric circles on the polishing surface.

13. A polishing machine for chemical-mechanical polishing of a semiconductor wafer, comprising:

a platen upon which a polishing pad is positionable;

a wafer carrier positionable opposite the polishing pad, the wafer being attachable to the wafer carrier and at least one of the platen or the wafer carrier being moveable to engage the wafer with the polishing pad and impart relative motion therebetween;

a support member positioned over the polishing pad at a fixed distance with respect to a polishing surface of the polishing pad;

a displacement sensor having a guide member mounted to the support member and a pin slidably attached to the guide member, the guide member being mounted to the support member to position the pin in a reference plane with respect to the polishing surface, the pin being controllably engageable with the polishing surface to follow the contour of the polishing surface as at least one of the sensor or the pad moves with respect to the other, wherein the sensor senses changes in vertical displacement between the support member and the pin as the pin follows the contour of the polishing surface and produces signals corresponding to the sensed displacement changes; and a converter operatively attached to the sensor to receive the signals generated by the sensor, the converter converting the signals from the sensor into a numerical representation of the contour of the polishing surface.

14. The polishing machine of claim 13 wherein the sensor is a piezoelectric sensor.

15. The polishing machine of claim 13 wherein the sensor is an electromagnetic sensor.

16. The polishing machine of claim 13, further comprising a control system for adjusting the pressure between the wafer and the polishing surface, the control system comprising:

a processor operatively coupled to the converter to receive the representation of the contour from the converter; and a wafer displacement mechanism operatively coupled to the processor, the processor controlling the wafer displacement mechanism to move the wafer with respect to the contour of the polishing surface measured by the sensor, whereby a desired pressure is maintained between the wafer and the pad across the surface of the wafer and throughout the polishing cycle.

17. The polishing machine of claim 16 wherein the displacement mechanism adjusts the height of the wafer carrier with respect to the polishing surface.

18. The polishing machine of claim 16 wherein the displacement mechanism comprises a plurality of actuators attached to the wafer carrier between the wafer carrier and a backface of the wafer, the processor controlling the actuators to produce localized pressures on the wafer that shape the wafer to correspond to the contour of the polishing surface measured by the sensor.

* * * * *

UNITED STATES PATENT AND TRADEMARK OFFICE
CERTIFICATE OF CORRECTION

PATENT : 5,618,447

DATED : April 8, 1997

INVENTOR(S) : Gurtej S. Sandhu

It is certified that error appears in the above-identified patent and that said Letters Patent is hereby corrected as shown below:

On the title page, in item [54] denoting the title, please delete "COUNTER" and insert therefor --CONTOUR--, as shown on the attached title page; and Delete the illustrative figure and substitute therefor the illustrative figure, as shown on the attached title page.

In the Drawings:
  Delete Fig. 2, and substitute therefor Fig. 2, as shown on the attached page.

Signed and Sealed this

Second Day of September, 1997

*Attest:*

BRUCE LEHMAN

*Attesting Officer*   *Commissioner of Patents and Trademarks*

United States Patent

Sandhu

Patent Number: 5,618,447
Date of Patent: Apr. 8, 1997

[54] POLISHING PAD CONTOUR METER AND METHOD FOR REAL-TIME CONTROL OF THE POLISHING RATE IN CHEMICAL-MECHANICAL POLISHING OF SEMICONDUCTOR WAFERS

[75] Inventor: Gurtej S. Sandhu, Boise, Id.

[73] Assignee: Micron Technology, Inc., Boise, Id.

[21] Appl. No.: 600,342

[22] Filed: Feb. 13, 1996

[51] Int. Cl.⁶ .................. H01L 21/00; B24B 49/00
[52] U.S. Cl. .................. 438/14; 216/88; 216/89; 216/86; 451/5; 451/8
[58] Field of Search ............. 216/86, 88, 89; 156/345, 626.1, 627.1, 636.1; 451/8, 21, 444

[56] References Cited

U.S. PATENT DOCUMENTS

| | | | |
|---|---|---|---|
| 4,193,226 | 3/1980 | Gill, Jr. et al. | 51/124 R |
| 4,199,902 | 4/1980 | Sauerland | 51/165 R |
| 4,407,094 | 10/1983 | Bennett et al. | 51/165 R |
| 4,793,895 | 12/1988 | Kaneta et al. | 156/627 |
| 4,879,258 | 11/1989 | Fisher | 437/225 |
| 4,910,155 | 3/1990 | Cote et al. | 437/8 |
| 4,971,445 | 11/1990 | Sato et al. | 356/376 |
| 5,272,117 | 12/1993 | Roth et al. | 437/228 |
| 5,324,381 | 6/1994 | Nishiguchi | 156/297 |
| 5,444,637 | 8/1995 | Smesny et al. | 364/556 |
| 5,486,129 | 1/1996 | Sandhu et al. | 41/5 |

*Primary Examiner*—R. Bruce Breneman
*Assistant Examiner*—Michael F. Adjodha
*Attorney, Agent, or Firm*—Seed and Berry LLP

[57] ABSTRACT

The present invention is a contour meter that measures the contour of a polishing surface of a polishing pad used in chemical-mechanical polishing of semiconductor wafers. The contour meter has a support member positionable over the polishing surface of a pad, a displacement sensor attached to the support member, and a converter operatively coupled to the displacement sensor. The sensor has a guide member and a pin slidably attached to the guide member. The sensor is attached to the support member to position the pin in a reference plane with respect to the polishing surface, and the pin is controllably engageable with the polishing surface to follow the contour of the polishing surface as at least one of the sensor or the pad moves with respect to the other. The sensor senses changes in the vertical displacement between the support member and the pin as the pin follows the contour of the polishing surface, and it produces signals corresponding to the sensed displacement changes. The converter receives the signals generated by the sensor and converts them into a numerical representation of the contour of the polishing surface.

18 Claims, 3 Drawing Sheets

Fig. 2